(12) United States Patent
Wong et al.

(10) Patent No.: US 11,650,954 B2
(45) Date of Patent: May 16, 2023

(54) REPLICATION CONTINUED ENHANCEMENT METHOD

(71) Applicant: KYNDRYL, INC., New York, NY (US)

(72) Inventors: Kim Poh Wong, Singapore (SG); Young Soo Basler, Moehlin (CH)

(73) Assignee: KYNDRYL, INC., New York, NY (US)

( * ) Notice: Subject to any disclaimer, the term of this patent is extended or adjusted under 35 U.S.C. 154(b) by 189 days.

(21) Appl. No.: 16/949,796

(22) Filed: Nov. 13, 2020

(65) Prior Publication Data

US 2022/0156226 A1 May 19, 2022

(51) Int. Cl.
*G06F 7/00* (2006.01)
*G06F 16/11* (2019.01)
*G06N 20/20* (2019.01)

(52) U.S. Cl.
CPC ........... *G06F 16/119* (2019.01); *G06N 20/20* (2019.01)

(58) Field of Classification Search
CPC ...... G06F 16/119; G06F 3/0647; G06F 3/065; G06F 16/184; G06F 16/26; G06F 16/254; G06N 20/20; G06N 5/003; H04L 67/1095
See application file for complete search history.

(56) References Cited

U.S. PATENT DOCUMENTS

| | | | |
|---|---|---|---|
| 6,073,180 A | 6/2000 | Onoda | |
| 6,415,373 B1 * | 7/2002 | Peters | H04N 21/23103 714/E11.034 |
| 7,586,909 B1 * | 9/2009 | Walrand | H04Q 3/68 370/231 |
| 8,209,283 B1 * | 6/2012 | Wang | G06F 16/178 707/610 |
| 9,209,956 B2 * | 12/2015 | Gorokhov | H04L 5/006 |
| 9,582,371 B1 * | 2/2017 | Spyker | G06F 11/2038 |
| 9,971,657 B2 | 5/2018 | Prahlad | |
| 10,635,642 B1 * | 4/2020 | Haggerty | H04L 67/06 |
| 11,385,936 B1 * | 7/2022 | Aleti | G06F 9/505 |
| 11,388,042 B2 * | 7/2022 | Vasseur | H04L 41/0654 |
| 11,388,233 B2 * | 7/2022 | Chang | G06F 21/6218 |
| 2007/0124415 A1 * | 5/2007 | Lev-Ran | H04L 51/063 709/217 |

(Continued)

OTHER PUBLICATIONS

Brownlee, "Bagging and Random Forest Ensemble Algorithms for Machine Learning," Machine Learning Mastery, Apr. 22, 2016 [last updated on Aug. 12, 2019], [accessed on May 8, 2020], 24 pages, Retrieved from the Internet KURL: https://machineleamingmastery.com/bagging-and-random-forest-ensemble-algorithms-for-machine-learning/>.

(Continued)

*Primary Examiner* — Mohammed R Uddin
(74) *Attorney, Agent, or Firm* — Dan Housley; Andrew M. Calderon; Calderon Safran & Cole P.C.

(57) ABSTRACT

A processor determines the data to be replicated in the production site. The processor splits the data into a plurality of blocks. The processor determines one or more replication links. The processor determines an order of each one of the plurality of blocks to be sent over the one or more replication links, where the order of each one of the plurality of blocks to be sent over the one or more replication links is determined by a machine learning model.

20 Claims, 5 Drawing Sheets

(56) References Cited

U.S. PATENT DOCUMENTS

| | | | | |
|---|---|---|---|---|
| 2007/0288533 | A1* | 12/2007 | Srivastava | G06F 16/1844 |
| | | | | 707/999.203 |
| 2012/0136828 | A1 | 5/2012 | Darcy | |
| 2012/0197844 | A1* | 8/2012 | Wang | G06F 11/1464 |
| | | | | 707/646 |
| 2013/0103650 | A1* | 4/2013 | Natanzon | G06F 11/2069 |
| | | | | 707/684 |
| 2014/0149350 | A1* | 5/2014 | Chen | H04L 67/1095 |
| | | | | 707/634 |
| 2015/0302071 | A1* | 10/2015 | Karve | G06F 11/1402 |
| | | | | 707/610 |
| 2016/0149669 | A1* | 5/2016 | Meyers | H04L 1/0073 |
| | | | | 714/750 |
| 2017/0026263 | A1* | 1/2017 | Gell | H04L 67/1023 |
| 2017/0161350 | A1 | 6/2017 | Calder | |
| 2017/0193003 | A1* | 7/2017 | Vijayan | G06F 3/0647 |
| 2020/0045100 | A1* | 2/2020 | Rowny | H04L 67/1097 |
| 2020/0192589 | A1* | 6/2020 | Mehta | G06F 3/0605 |
| 2020/0241755 | A1* | 7/2020 | Bora | G06F 3/065 |
| 2020/0242082 | A1* | 7/2020 | Chmiel | H04L 67/1097 |
| 2020/0374218 | A1* | 11/2020 | Hygren | H04L 47/34 |
| 2020/0403868 | A1* | 12/2020 | Punathil | H04L 41/0823 |
| 2021/0051104 | A1* | 2/2021 | He | G06N 20/00 |

OTHER PUBLICATIONS

Mell, et al., "The NIST Definition of Cloud Computing", National Institute of Standards and Technology, Special Publication 800-145, Sep. 2011, 7 pages.

Ping, et al., "Towards Optimal Data Replication Across Data Centers," 2011 31st International Conference on Distributed Computing Systems Workshops, 2011, pp. 66-71, Minneapolis, Mn, Doi: 10.1109/ICDCSW.2011.49, Retrieved from the Internet: <URL: https://ieeexplore.IEEE.org/document/5961495>.

* cited by examiner

REPLICATION CONTINUED ENHANCEMENT METHOD

BACKGROUND

The present invention relates, generally, to the field of computing, and more particularly to continued enhancement of data replication using a machine learning model.

Data replication is generally used for disk or cloud storage replication or by various database management systems (DBMS). Data replication methods may have a primary and secondary relationship between the original and the copies. Typically, the primary system logs the updates and then replicates the updated data to the secondary systems. Data replication may be file-based replication, distributed shared memory replication, primary-backup replication or multi-primary replication.

Machine learning is a subfield of computer science and statistics that explores the construction and study of algorithms that can learn from data. Such algorithms operate by building a model based on inputs and using the model to make predictions or decisions, rather than following only explicitly programmed instructions.

SUMMARY

According to one embodiment, a method, computer system, and computer program product for replication continued enhancement of data from a production site to an alternate site is provided. The present invention may include a processor determines the data to be replicated in the production site. The processor splits the data into a plurality of blocks. The processor determines one or more replication links. The processor determines an order of each one of the plurality of blocks to be sent over the one or more replication links, where the order of each one of the plurality of blocks to be sent over the one or more replication links is determined by a machine learning model.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
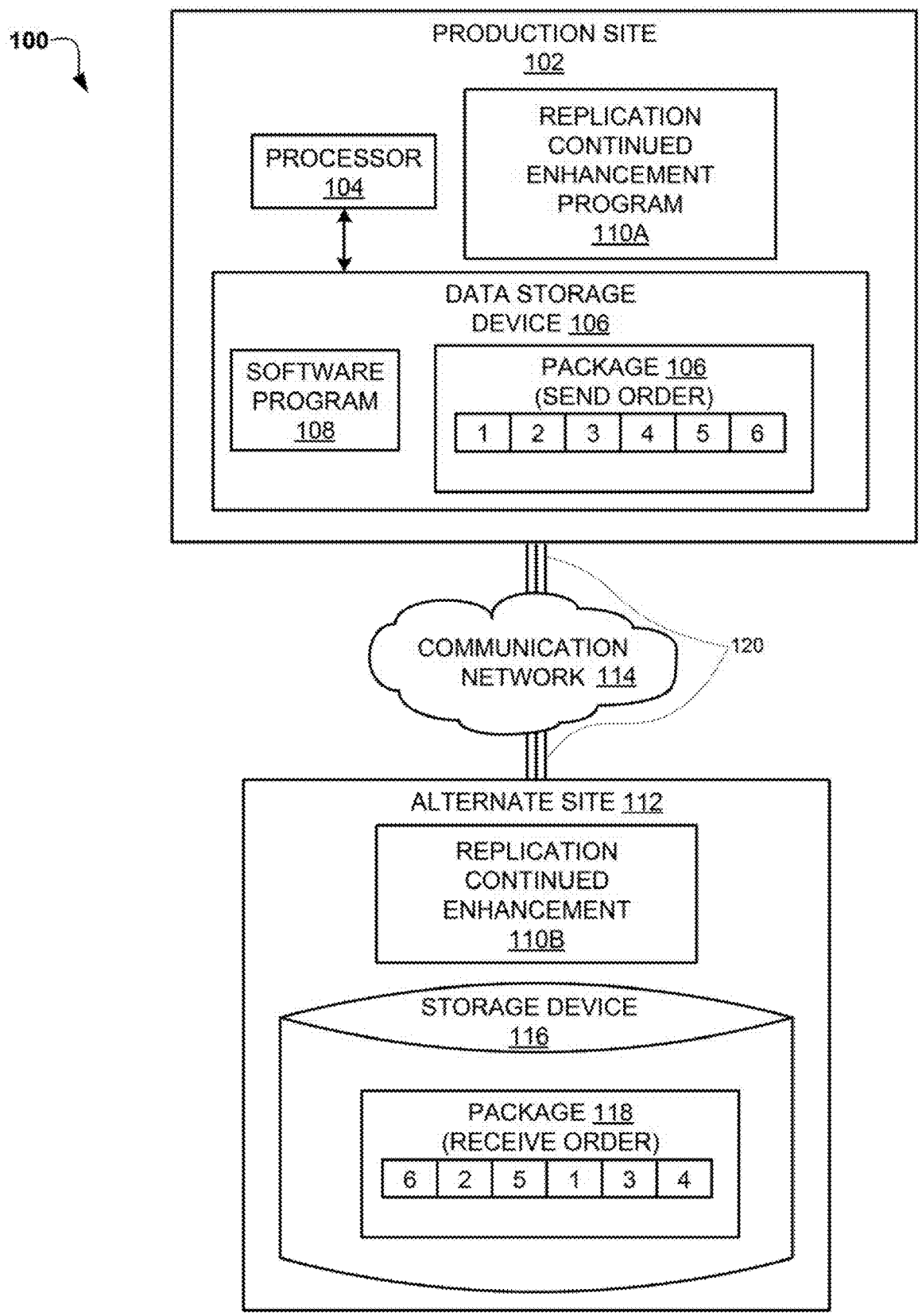
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to continued enhancement of data replication using a machine learning model. The following described exemplary embodiments provide a system, method, and program product to, among other things, replicate a large amount of data from a production site to an alternate site in an optimized way by dividing the data into blocks of various sizes and sending the blocks in a specific order using available replication links based on a sequence suggested by a Bagging with Random Forest algorithm coupled with ontology evaluation algorithm. Therefore, the present embodiment has the capacity to improve the technical field of data replication by reducing the replication time using a method that divides the replication data into blocks and, using a machine learning method of Bagging with Random Forest coupled with ontology evaluation algorithms, predicts the order of the blocks to be sent via available replication channels to achieve the fastest replication time.

As previously described, machine learning is a subfield of computer science and statistics that explores the construction and study of algorithms that can learn from data. Such algorithms operate by building a model based on inputs and using the model to make predictions or decisions, rather than following only explicitly programmed instructions.

Large data replication lasts for extended periods of time due to inefficient replication methods that typically do not adopt to frequently changing bandwidth of the replication link and use only a single replication link without utilizing multiple available replication links. As such, it may be advantageous to, among other things, implement a system that gathers the data, splits the data into blocks and identifies the optimal order in which the blocks should be sent via available replication links using a Bagging with Random Forest algorithm coupled with ontology evaluation algorithm to achieve an optimal time for the replication of the data.

Bagging with Random Forest algorithm is a machine learning algorithm that combines a bootstrap aggregation (Bagging) with random forest methods. Bootstrap aggregation is a statistical method for estimating a quantity from a data sample, such as a data sample of available bandwidths of each of the replication links or a data sample of blocks received at the alternate site and the data associated with the block such as size and time it took to replicate the block. Bagging with Random Forest is a technique that combines the predictions from multiple algorithms together to make more accurate predictions, typically in decision trees. Bagging with Random Forest enables the reduction of correlations between sub models generated by the bagged decision trees.

According to one embodiment, a plurality of data that needs to be replicated is gathered in one storage device. The gathered data is then divided a plurality of blocks where each block may be of a different size, based on available replication links. Then, a machine learning method that uses a Bagging with Random Forest coupled with ontology evaluation identifies an optimal order of the blocks to be sent via each available replication link in order to reduce the speed of the replication process. The blocks are sent over the available replication links in a determined order while the machine learning method analyzes the received packages or the bandwidth of each replication link to determine the most optimal way to replicate the data by updating the order of the blocks and their corresponding replication links. After replication of each block is complete, the received block is validated and constructed into the plurality of data by using a convergence (routing table), header keys and footer keys of each block in order to eliminate errors and construct the package from the plurality of received blocks at the alternate site.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to replicate data from a production site to an alternate site in an optimized way buy using a machine learning method that combines Bagging with Random Forest coupled with ontology evaluation algorithms to identify the order of blocks to be sent via available replication links.

Referring to FIG. 1, an exemplary networked computer environment 100 is depicted, according to at least one embodiment. The networked computer environment 100 may include a production site 102 and an alternate site 112 interconnected via a communication network 114 via replication links 120. According to at least one implementation, the networked computer environment 100 may include a plurality of production sites 102 and alternate sites 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. The connections may have simultaneously connected physical or virtual replication links 120 such as 5G, 4G, MPLS, GPON, Internet, and IPSEC VPN. It may be appreciated that FIG. 1 provides only an illustration of one implementation and does not imply any limitations with regard to the environments in which different embodiments may be implemented. Many modifications to the depicted environments may be made based on design and implementation requirements.

Production site 102 may include at least one processor 104 and a data storage device 106 that is enabled to host and run a software program 108 and a replication continued enhancement program 110A, host a package 106, and communicate with the alternate site 112 via the replication links 120 of the communication network 114, in accordance with one embodiment of the invention. Production site 102 may be, for example, a mobile device, a telephone, a personal digital assistant, a netbook, a laptop computer, a tablet computer, a desktop computer, a server, a virtual machine or any type of one or more physical or virtual computing devices capable of running a program and accessing a network. The production site 102 may also operate in a cloud computing service model, such as Software as a Service (SaaS), Platform as a Service (PaaS), or Infrastructure as a Service (IaaS). The production site 112 may also be located in a cloud computing deployment model, such as a private cloud, community cloud, public cloud, or hybrid cloud. As will be discussed with reference to FIG. 3, the production site 102 may include internal components 302a and external components 304a, respectively.

The package 106 may be data that is gathered in order to prepare for an optimal replication using the replication continued enhancement method. The package 106 may be divided into blocks, such as depicted in FIG. 1, where package 106 may have six blocks. The number of the blocks may be determined based on the number of replication links 120, packet size, specific parameters of the replication links, and an actual bandwidth of each of the replication links.

The alternate site 112 may be a laptop computer, netbook computer, personal computer (PC), a desktop computer, a server, a virtual machine or any programmable electronic device or any network of programmable electronic devices capable of hosting a storage device 116 and hosting and running a replication continued enhancement program 110B, that is capable of communicating with the production site 102 via one or more replication links 120 of the communication network 114, in accordance with embodiments of the invention. As will be discussed with reference to FIG. 3, alternate site 112 may include internal components 302b and external components 304b, respectively. The alternate site 112 may also operate in a cloud computing service model, such as Software as a Service (SaaS), Platform as a Service (PaaS), or Infrastructure as a Service (IaaS). The production site 112 may also be located in a cloud computing deployment model, such as a private cloud, community cloud, public cloud, or hybrid cloud.

The storage device 116 is capable of hosting package 118 that may be received in blocks via replication links 120. The package 118 is identical to package 106 after the replication continued enhancement program is complete as depicted below.

According to the present embodiment, the replication continued enhancement program 110A, 110B may be a program capable of determining and packaging the data to be replicated into a plurality of blocks, sending the blocks in an order and via various available replication links based on predictions of a machine learning algorithm, where the machine learning algorithm combines Bagging with Random Forest coupled with ontology evaluation algorithms, and reconstructing the received data using a convergence (routing table), header, and footer keys of each block in order to validate the completion of the data transfer. The replication continued enhancement method is explained in further detail below with respect to FIG. 2.

Figure 2:
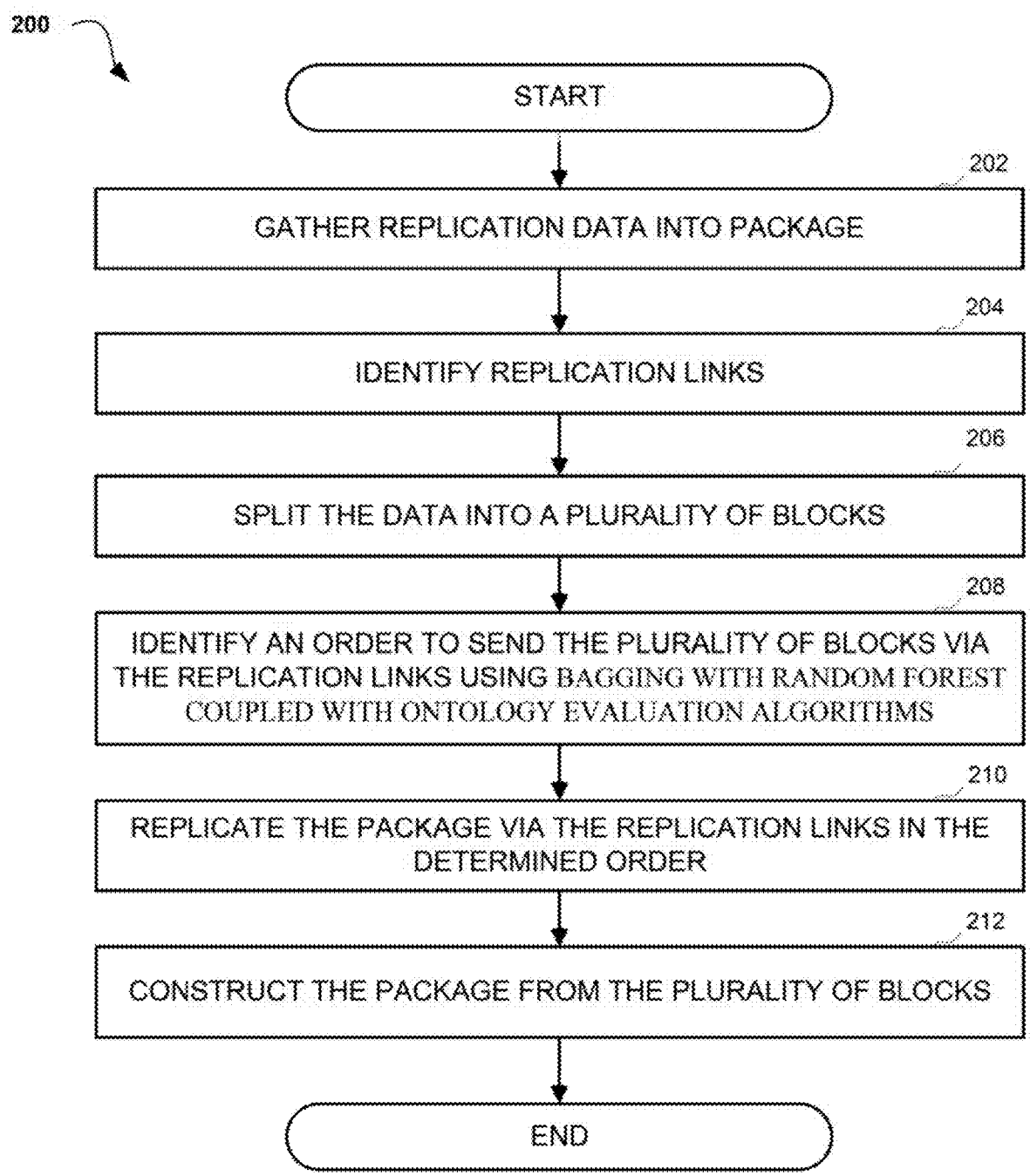
FIG. 2 is an operational flowchart illustrating a replication continued enhancement process according to at least one embodiment.

Referring now to FIG. 2, an operational flowchart illustrating a replication continued enhancement process 200 is depicted according to at least one embodiment. At 202, the replication continued enhancement program 110A, 110B gathers replication data into a package. According to an example embodiment, the replication continued enhancement program 110A, 110B may identify all the data that needs to be replicated and gather the data at the same storage device in order to speed up the replication. For example, the replication data may be identified by a user that specifies a folder or file and the replication continued enhancement program 110A, 110B may store the identified data on data storage device 106 as package 106. In another embodiment, the replication continued enhancement program 110A, 110B may identify the data during run time and gather only a part of the data that is required for each block that is sent over the replication link on the run.

Next, at 204, replication continued enhancement program 110A, 110B identifies replication links. According to an example embodiment, replication continued enhancement program 110A, 110B may analyze network traffic of the production site 102 and determine available replication links 120 and their appropriate bandwidth. For example, in case of multiple TCP/IP connections a "netstat" command may be utilized to analyze the connected IP addresses that may be used as replication links. In another embodiment, the replication continued enhancement program 110A, 110B may identify and use only replication links that were selected by the user using a graphical user interface (GUI) of the replication continued enhancement program 110A, 110B.

Then, at 206, replication continued enhancement program 110A, 110B splits the package into a plurality of blocks. According to an example embodiment, replication continued enhancement program 110A, 110B may split the package 106 into a plurality of blocks wherein each block has a checksum value, header keys and footer keys for future validation. The size of each block may be based on the limitations of each available replication link, current bandwidth of each of the replication links or having a random size. For example, package 106 may be divided into six blocks as depicted in FIG. 1. In another embodiment, replication continued enhancement program 110A, 110B may determine the size and number of blocks based on the machine learning algorithm, such as Bagging with Random Forest coupled with ontology evaluation algorithms.

Next, at 208, the replication continued enhancement program 110A, 110B identifies an order to send the plurality of blocks via the replication links using a Bagging with Random Forest coupled with ontology evaluation algorithms. According to an example embodiment, the replication continued enhancement program 110A, 110B may determine the order of the generated blocks to be replicated via each replication link using Bagging with Random Forest coupled with ontology evaluation algorithms. As previously mentioned, Random Forest method is an improvement over Bagged decision trees that creates multiple models with datasets created using a bootstrap sampling. Thus, by analyzing samples that are sent over available replication channels the random forest method with an ontology evaluation algorithm defines, during runtime, the fastest replication links and assigns available blocks to different replication channels in order to make the replication in a shortest period of time. For example, as depicted in FIG. 1, if only one replication channel is available, the replication continued enhancement program 110A, 110B may determine that instead of sending the plurality of blocks from one to six, due to changes in the bandwidth of the replication link, it will be faster to send the blocks in the of 6, 2, 5, 1, 3, 4 (as depicted in FIG. 1).

Then, at 210, the replication continued enhancement program 110A, 110B replicates the blocks via the replication links in the determined order. According to an example embodiment, the replication continued enhancement program 110A, 110B sends each of the blocks from the package 112 in the identified order and via each channel that was determined using Bagging with Random Forest coupled with ontology evaluation algorithms.

Next, at 212, the replication continued enhancement program 110A, 110B constructs the package from the received plurality of blocks. According to an example embodiment, the replication continued enhancement program 110A, 110B may construct the package 118 from the blocks received via replication links at the alternate site 112, using convergence (routing), header keys, and footer keys transferred with each block. Convergence is the state of a set of routers that have the same topological information about the internetwork in which they operate such as a routing table. A routing table maintains a record of the routes to various network destinations and, therefore, allows the received blocks to be arranged in an order as they were sent. Header keys and footer keys may be specific values in each of the plurality of blocks that allows to construct the package in the original order. In another embodiment, the replication continued enhancement program 110A, 110B may validate each package using a checksum value of each of the received blocks.

It may be appreciated that FIG. 2 provides only an illustration of one implementation and does not imply any limitations with regard to how different embodiments may be implemented. Many modifications to the depicted environments may be made based on design and implementation requirements.

Figure 3:
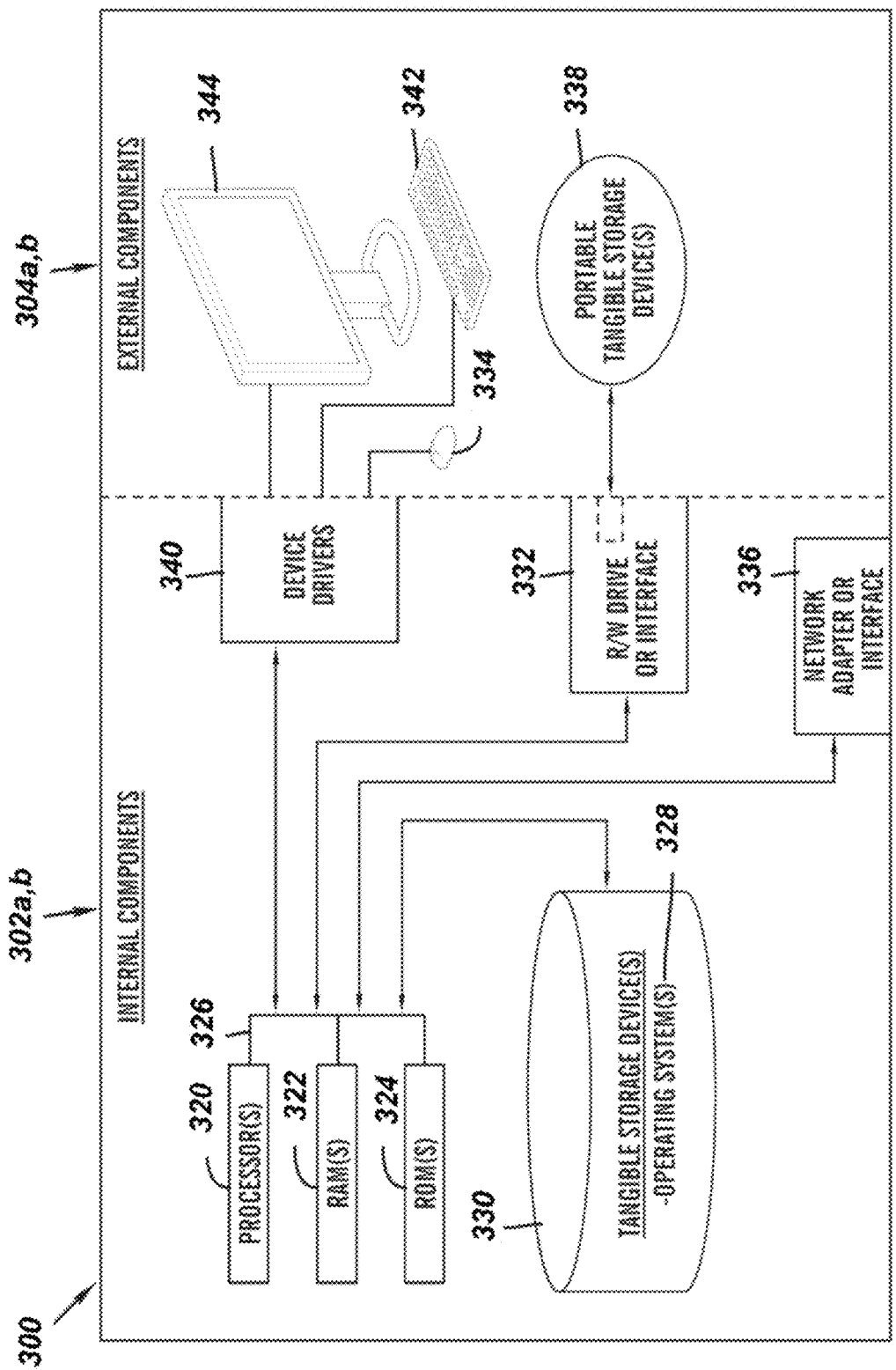
FIG. 3 is a block diagram of internal and external components of computers and servers depicted in FIG. 1 according to at least one embodiment.

FIG. 3 is a block diagram 300 of internal and external components of the production site 102 and the alternate site 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The production site 102 and the alternate site 112 may include respective sets of internal components 302 $a,b$ and external components 304 $a,b$ illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the replication continued enhancement program 110A in the production site 102, and the replication continued enhancement program 110B in the alternate site 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 $a,b$ also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the cognitive screen protection program 110A, 110B, can be stored on one or more of the respective portable computer-readable tangible storage devices 338, read via the respective R/W drive or interface 332, and loaded into the respective hard drive 330.

Each set of internal components 302 $a,b$ also includes network adapters or interfaces 336 such as a TCP/IP adapter cards, wireless Wi-Fi interface cards, or 3G or 4G wireless interface cards or other wired or wireless communication links. The software program 108 and the replication continued enhancement program 110A in the production site 102 and the replication continued enhancement program 110B in the alternate site 112 can be downloaded to the production site 102 and the alternate site 112 from an external computer via a network (for example, the Internet, a local area network or other, wide area network) and respective network adapters or interfaces 336. From the network adapters or interfaces 336, the software program 108 and the replication continued enhancement program 110A in the production site 102 and the replication continued enhancement program 110B in the alternate site 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
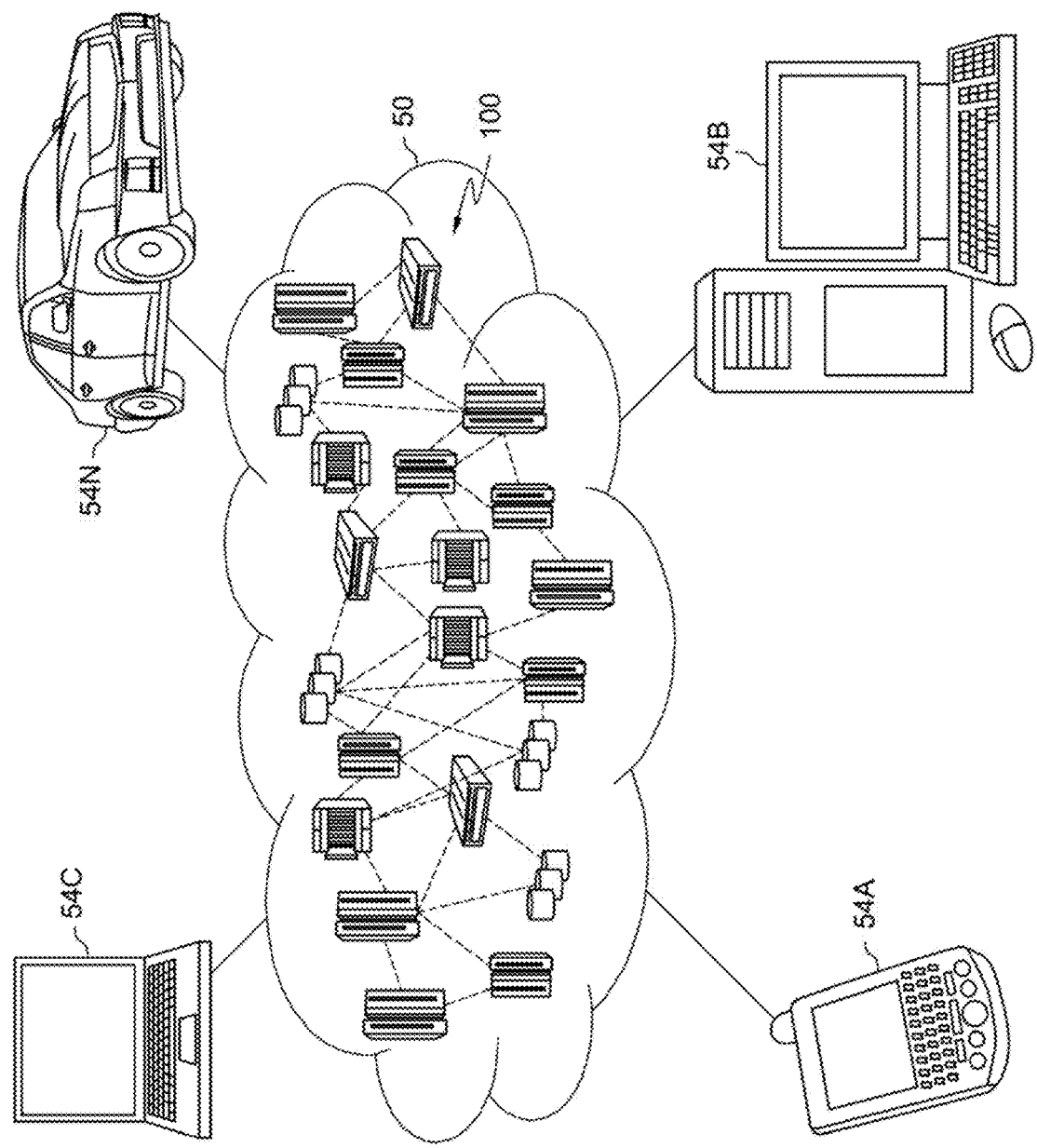
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
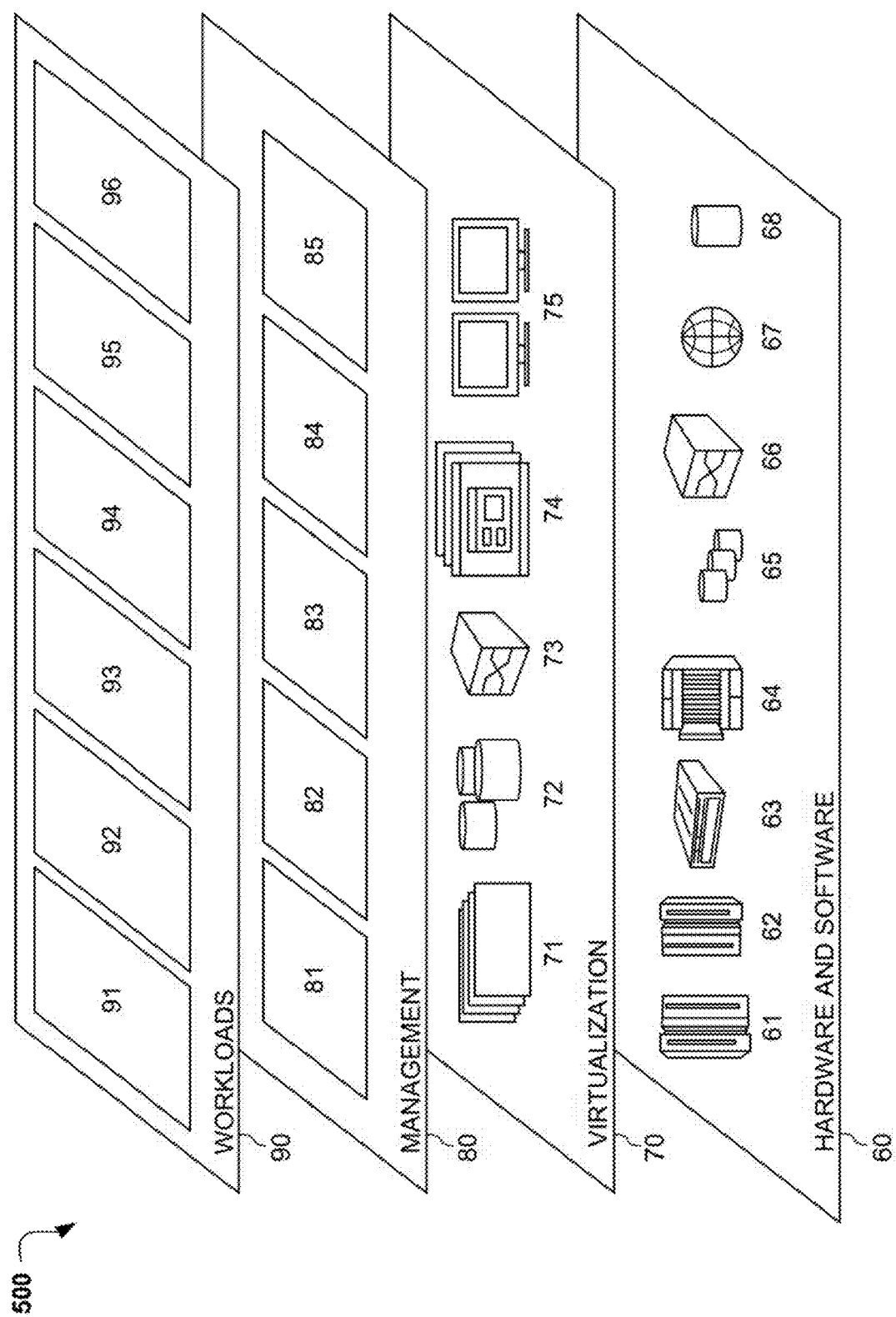
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and replication continued enhancement 96. Replication continued enhancement 96 may relate to determining replication data, dividing the data into a plurality of blocks and using Bagging with Random Forest coupled with ontology evaluation algorithms to determine an optimal order of the blocks and replicating the blocks on an alternate site based on the determined order.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for replication continued enhancement of data from a production site to an alternate site, the method comprising:
   identifying a plurality of data to be replicated in the production site;
   identifying one or more replication links;
   splitting the plurality of data into a plurality of blocks based on limitations of the one or more replication links; and
   organizing each block within the plurality of blocks to be sent over the one or more replication links in an order based on a Bagging with Random Forest algorithm coupled with an ontology evaluation algorithm.

2. The method of claim 1, wherein the Bagging with Random Forest algorithm coupled with the ontology evaluation algorithm use a data sample of bandwidths of each of the replication links.

3. The method of claim 1, wherein the plurality of blocks comprise a checksum value, a header key and a footer key.

4. The method of claim 3, further comprising:
   sending the plurality of blocks in the order via the one or more replication links; and
   causing the alternate site to validate each one of the plurality of blocks based on the checksum value.

5. The method of claim 1, wherein each one of the plurality of blocks has a different size.

6. The method of claim 5, wherein the size of each block is based on the one or more replication links.

7. The method of claim 5, wherein the size of each block is determined by the Bagging with Random Forest coupled with ontology evaluation algorithms.

8. A computer system for replication continued enhancement of data from a production site to an alternate site, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   identifying a plurality of data to be replicated in the production site;
   identifying one or more replication links;
   splitting the plurality of data into a plurality of blocks based on limitations of the one or more replication links; and
   organizing each block within the plurality of blocks to be sent over the one or more replication links in an order determined using a Bagging with Random Forest algorithm coupled with an ontology evaluation algorithm, wherein the order is an optimal order of the plurality of blocks to be sent via the one or more replication links to achieve a fastest replication time.

9. The computer system of claim 8, wherein the Bagging with Random Forest algorithm coupled with the ontology evaluation algorithm use a data sample of bandwidths of each of the replication links.

10. The computer system of claim 8, wherein the plurality of blocks comprise a checksum value, a header key and a footer key.

11. The computer system of claim 10, further comprising:
sending the plurality of blocks in the order via the one or more replication links; and
causing the alternate site to validate each one of the plurality of blocks based on the checksum value.

12. The computer system of claim 8, wherein each one of the plurality of blocks has a different size.

13. The computer system of claim 12, wherein the size of each block is based on the one or more replication links.

14. The computer system of claim 12, wherein the size of each block is determined by the Bagging with Random Forest coupled with ontology evaluation algorithms.

15. A computer program product for replication continued enhancement of data from a production site to an alternate site, the computer program product comprising:
one or more computer-readable tangible storage medium and program instructions stored on at least one of the one or more tangible storage medium, the program instructions executable by a processor, the program instructions comprising:
program instructions to identify a plurality of data to be replicated in the production site;
program instructions to identify one or more replication links;
program instructions to split the plurality of data into a plurality of blocks based on limitations of the one or more replication links;
program instructions to organize each block within the plurality of blocks to be sent over the one or more replication links in an order based on a Bagging with Random Forest algorithm coupled with an ontology evaluation algorithm; and
program instructions to update the order based on analyzing received packages or a bandwidth of each of the one or more replication links.

16. The computer program product of claim 15, wherein the Bagging with Random Forest algorithm coupled with ontology evaluation algorithm use a data sample of bandwidths of each of the replication links.

17. The computer program product of claim 15, wherein the plurality of blocks comprise a checksum value, a header key and a footer key.

18. The computer program product of claim 17, further comprising:
program instructions to send the plurality of blocks in the order via the one or more replication links; and
program instructions to cause the alternate site to validate each one of the plurality of blocks based on the checksum value.

19. The computer program product of claim 15, wherein each one of the plurality of blocks has a different size.

20. The computer program product of claim 19, wherein the size of each block is based on the one or more replication links.

* * * * *